United States Patent [19]

Garrett

[11] Patent Number: 4,733,526
[45] Date of Patent: Mar. 29, 1988

[54] SEPARATION OF GAS MIXTURE

[75] Inventor: Michael E. Garrett, Woking, England

[73] Assignee: The BOC Group plc, Windlesham, England

[21] Appl. No.: 836,029

[22] Filed: Mar. 4, 1986

[30] Foreign Application Priority Data

Mar. 4, 1985 [GB] United Kingdom ............ 8505521

[51] Int. Cl.⁴ .................................................. F02C 6/00
[52] U.S. Cl. ................................... 60/39.02; 60/39.07
[58] Field of Search ............... 60/39.02, 39.07; 55/75, 55/384

[56] References Cited

U.S. PATENT DOCUMENTS 4,434,613  3/1984  Stahl ................................... 60/39.07
4,528,811  7/1985  Stahl ................................... 60/39.07

FOREIGN PATENT DOCUMENTS 1040809   9/1966  United Kingdom.
1049876  11/1966  United Kingdom.
1061393   3/1967  United Kingdom.
2042365A  9/1980  United Kingdom.
2127710A  4/1984  United Kingdom.

Primary Examiner—Louis J. Casaregola
Attorney, Agent, or Firm—R. Hain Swope; Chris P. Konkol; Larry R. Cassett

[57] ABSTRACT

Fuel gas (typically taken from a source of natural gas associated with oil deposits) is burnt with air in a turbine 2 to produce a gaseous mixture comprising nitrogen, combustion products and oxygen. The mixture cotnains less than 20% by volume of oxygen. The mixture is cooled in a cooler 4 by heat exchange with water and then compressed in a compressor 6 which is driven by the turbine 2. The compressed gaseous mixture is separated typically by pressure swing adsorption to produce a gaseous nitrogen product suitable for use in the enhanced recovery of oil.

6 Claims, 1 Drawing Figure

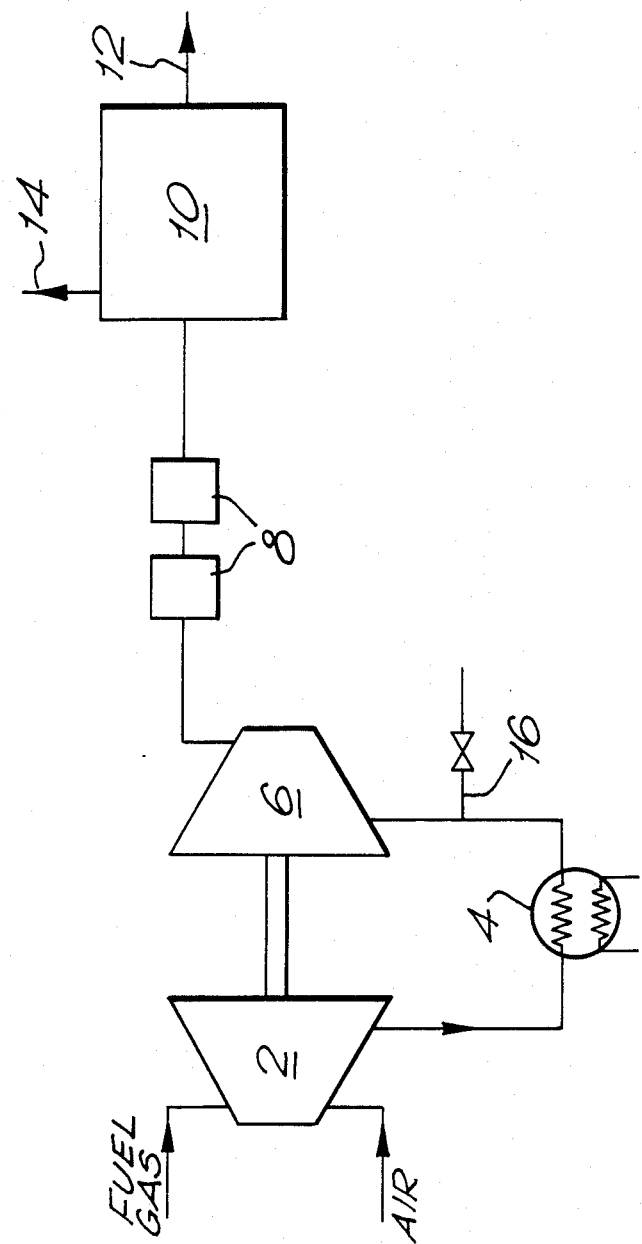

SEPARATION OF GAS MIXTURE

This invention relates to a method for the separation of a gas mixture. In particular, it relates to the separation of a gas mixture to produce a nitrogen product acceptable for use in enhancing recovery of oil from an oil well.

It is known to use oxygen as a medium for pressurising oil deposits associated with an oil well so as to enhance the recovery of oil from the well. A potential need is recognised for such processes in, for example North Sea oil wells whose readily recoverable oil deposits have been depleted. Nitrogen is convehtionally obtained on a commercial scale by the physical separation of air into a nitrogen-rich stream and an oxygen-rich stream. However, processes which effect such a physical separation of air are relatively power-intensive and are therefore not particularly suited for use offshore.

There is thus a need for an improved method and apparatus for producing nitrogen. The invention aims at providing a method and apparatus that meets this need.

According to the present invention there is provided a method of producing nitrogen, comprising the steps of burning a fuel gas with air to form a gaseous mixture comprising nitrogen, oxygen and combustion products, the oxygen concentration of the gaseous mixture being less than 20% by volume, reducing the temperature of the gaseous mixture, then compressing the gaseous mixture, and separating the compressed gaseous mixture to obtain a nitrogen product, wherein the burning of the fuel gas takes place in a combustion chamber of a gas turbine and energy developed by the turbine is employed to drive the compressor.

The invention also provides apparatus for producing nitrogen, comprising a gas turbine having a combustion chamber for burning fuel gas with air to form a gaseous mixture comprising nitrogen, oxygen and combustion products (the oxygen concentration of the gaseous mixture being less than 20% by volume), means for reducing the temperature of the gaseous mixture, a compressor for compressing the gaseous mixture, and means for separating the compressed gaseous mixture to obtain a nitrogen product, said compressor being able to be driven by means of a turbine.

The method and apparatus may be used to produce nitrogen for use in enhanced oil recovery. For this use, it is not essential for the nitrogen product to be pure. It is however desirable that it be substantially free of oxygen. Accordingly, it is desirable that the amount of excess air employed in the combustion of the fuel to ensure that substantially no unoxidised hydrocarbon is included in the combustion products is desirably such that the oxygen content of the gaseous mixture produced is substantially less than that of air. Typically, this gas mixture may contain in the order of 5% by volume of oxygen. By so reducing the concentration of oxygen the eventual separation of the gas mixture is facilitated. The combustion products typically include carbon monoxide, carbon dioxide and water vapour.

When the method and apparatus according to the invention are used offshore, the source of the fuel gas is typically natural gas, and is preferably taken from a source that is associated with the oil well deposits. This gas (sometimes referred to as "associated gas") is normally flared off. The fuel gas is burnt in a combustion chamber of the gas turbine. The turbine is employed to drive the compressor. To this purpose the rotor of the turbine is preferably coupled to the rotor of a turbo-compressor.

The reduction in temperature of the gaseous mixture is preferably effected by heat exchange with water, the temperature of the gaseous mixture therey being reduced to approximately ambient temperature.

The pressure to which the gaseous mixture is compressed can be chosen in accordance with the needs of the selected gas separation technique.

Preferably, the gas mixture is separated by pressure swing adsorption. Alternatively it may be separated by cryogenic rectification or by means of semi-permeable membranes, or by a combination of one or more of these techniques with pressure swing adsorption.

In a preferred pressure swing adsorption technique for use in the invention, at least one bed of molecular sieve is employed, the molecular sieve being able selectively to adsorb oxygen, carbon monoxide and carbon dioxide from a gas mixture comprising nitrogen, oxygen, carbon dioxide and small amounts of carbon monoxide. A carbon molecular sieve may be employed to effect such a separation. An alternative approach is to employ at least one bed of molecular sieve that is able selectively to adsorb carbon monoxide and carbon dioxide from a gas mixture comprising oxygen, nitrogen, carbon monoxide and carbon dioxide. Whereas in the former technique a product gas comprising nitrogen is produced as the unadsorbed gas, in the latter technique the unadsorbed gas consists essentially of nitrogen and oxygen. This unadsorbed gas mixture may then be further separated by means of pressure swing adsorption (typically using at least one bed of carbon molecular sieve) to give an unadsorbed gas comprising product nitrogen, or it may be separated by cryogenic rectification or by means of semi-permeable membranes.

In all these examples of the method according to the present invention, water vapour is preferably removed from the compressed gas mixture by means of a desiccant. Typically, each bed of molecular sieve that is employed is provided with a preliminary layer of desiccant that takes up the water vapour.

The method and apparatus according to the present invention is able to produce nitrogen in relatively high yield in comparison with conventional PSA processes for separating nitrogen from air. Moreover, if used with a free source of fuel gas such as associated gas that is normally flared off at an oil well, operating costs can be kept to a minimum.

The method and apparatus according to the invention will be further described by way of example with reference to the accompanying drawing which is a schematic diagram illustrating one apparatus for performing the method according to the present invention.

Referring to the accompanying drawing, the illustrated apparatus includes a gas turbine 2 whose combustion chamber has an inlet for air and an inlet for fuel gas. The gas turbine may be of the kind described and illustrated in our UK patent application No. 2 117 053 A. The gas turbine 2 has an outlet through which the combustion gases exhaust and which communicates with a cooler 4 in which the combustion gases are cooled by heat exchange with for example water. The resulting cooled gas mixture is then compressed in a turbocompressor 6. The rotor (not shown) of the compressor 6 is mounted on the same shaft as the rotor (not shown) of the gas turbine 2 and thus the turbine is able to drive the compressor. It is a feature of this invention that the turbine is able to generate all the energy necessary to effect the necessary compression for the subsequent gas separation, and accordingly there is no need to employ any additional independently powered compressor.

The inlet to the compressor 6 also communicates with a valved balancing line 16.

In the event that the supply of gas from the turbine does not meet the demand of the compressor the valve in the balancing line opens to allow a balancing quantity of air to be drawn into the compressor. In the event that the supply of gas from the turbine exceeds the demand of the compressor the valve in the balancing line 16 opens to allow the excess gas to be jettisoned.

The compressed gas mixture is then passed through filters 8 effective to remove particulates and liquid droplets therefrom. The gas mixture is then passed into a separation unit 10 (having an outlet 12 for product gas and an outlet 14 for waste gas) which may be of one of the kinds described above. For example, the unit may be of the kind shown in FIG. 2 A of our UK patent No. 2 042 365 B and may operate on the cycle illustrated in FIG. 2 B of that patent.

In operation of the illustrated apparatus to produce a nitrogen product suitable for use in enhanced oil recovery the fuel gas may be natural gas which would otherwise be flared from the oil well. Cooling to ambient temperature may be effected in the cooler 4 by means of heat exchange with sea water. Typically, the gas which is fed to the compressor 6 comprises approximately 80% by volume of nitrogen, 5% by volume of oxygen and 15% by volume of oxides of carbon and water vapour. There may also be trace quantities of nitrogen oxides and sulphur oxides. A PSA process such as that described in our UK patent No. 2 042 365 B is capable of separating such a gas mixture to produce product consisting of nitrogen of at least 99% purity.

If desired, the exhaust from the turbine may be mixed with exhaust from a flare before being cooled and compressed.

The nitrogen product may be employed in a conventional process for the enchanced recovery of oil.

I claim:

1. A method of producing nitrogen comprising the steps of burning a fuel gas with air in the combustion chamber of a gas turbine to form a gaseous mixture comprising nitrogen, oxygen and combustion products, the oxygen concentration of the gaseous mixture being less than 20% by volume, reducing the temperature of the gaseous mixture, compressing the gaseous mixture in a compressor, and physically separating the compressed gaseous mixture by pressure swing adsorption to obtain a nitrogen-rich product, wherein energy developed by the turbine is employed to drive the compressor.

2. A method as claimed in claim 1, in which the fuel gas is natural gas.

3. A method as claimed in claim 1, in which the pressure swing adsorption utilizes at least one bed of molecular sieve having the capacity to selectively adsorb oxygen, carbon monoxide and carbon dioxide from a gas mixture comprising nitrogen, oxygen, carbon monoxide and carbon dioxide, whereby a product gas comprising nitrogen is produced as the unadsorbed gas.

4. A method as claimed in claim 1, in which said separation is carried out in two steps comprising: utilizing at least one bed of molecular sieve to selectively adsorb carbon monoxide and carbon dioxide from a gas mixture comprising nitrogen, oxygen, carbon monoxide and carbon dioxide thus forming an unadsorbed gas mixture comprising oxygen and nitrogen; and further separating the unadsorbed gas mixture to produce the nitrogen-rich product.

5. A method as claimed in claim 4, in which the second step separation is performed by a member selected from the group consisting of pressure swing adsorption, cryogenic rectification and semi-permeable membranes.

6. A method as claimed in claim 1, additionally including the step of removing water vapour from the compressed gas mixture by means of a desiccant during said separation.

* * * * *